May 6, 1958 F. SMITH 2,833,207
COTTON BALE WEIGHT GAUGE
Filed Dec. 22, 1952
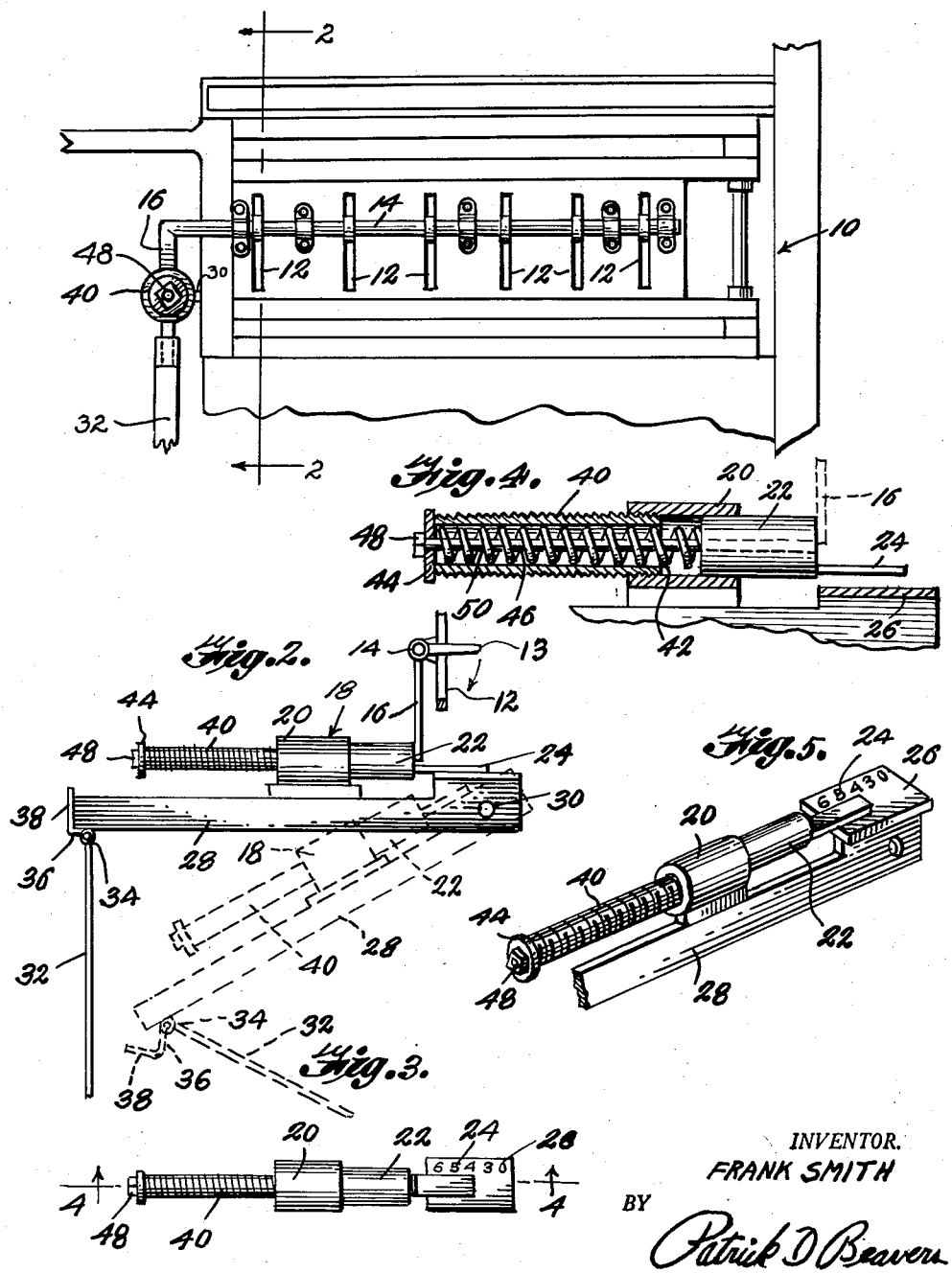
INVENTOR.
FRANK SMITH
BY
Patrick D Beaver
ATTORNEY

United States Patent Office

2,833,207
Patented May 6, 1958

2,833,207

COTTON BALE WEIGHT GAUGE

Frank Smith, Orosi, Calif.

Application December 22, 1952, Serial No. 327,237

3 Claims. (Cl. 100—99)

This invention relates to improvements in weight indicating devices for indicating the weight of cotton in a cotton bale press and has for its primary object to provide a weight indicating attachment for a standard press in order to accurately determine the weight of a bale before it is tied so that bales of cotton of uniform and predetermined weight can be formed.

Another object of this invention is to provide a mechanical weight indicating attachment which can be sesecured to a standard press without modifying the press and in a manner that it does not interfere with the normal operation of the press.

A further object of this invention is to provide weight indicating means reactive to the normal pressure exerted by the holding dogs to indicate the weight of the cotton before the bale is tied.

These and ancillary objects are attained by this invention, the preferred embodiment of which is set forth in the following description and illustrated in the accompanying drawing, wherein;

Figure 1 is a fragmentary front elevational view of a bale box in a press with a weighing device in accordance with this invention attached thereto;

Figure 2 is a sectional view with certain parts removed of the weighing device taken on line 2—2 of Figure 1;

Figure 3 is a top plan view thereof;

Figure 4 is a longitudinal sectional view taken on line 4—4 of Figure 3, and

Figure 5 is a perspective view.

Referring now more particularly to the accompanying drawing, 10 indicates a standard bale box of a conventional cotton press. One side of the bale box is provided with a plurality of vertically extending horizontally spaced slots 12 and a horizontal rod 14 is pivotally affixed to the side of the box and has affixed thereto a plurality of radially extending fingers 13 each of which extends into one of the slots 12.

To one end of the rod, is attached a lateral finger 16, as seen in Figure 2, which finger is swung by the rotary motion of the rod 14 as the dogs have greater pressure exerted on them by an increase in the amount of cotton in the box. The arm 16 operates the weighing device 18 which includes a sleeve 20 in which a plunger 22 is slidably disposed. A pointer or indicating bar 24 is formed on one end of the plunger and extends axially thereof. The bar 24 is flat and slidably overlies a table 26, which is inscribed with pound indicia or calibrated to visually indicate the bale weight.

The sleeve 20 is fixed in a horizontal position on a platform 28 and is open at both ends, with the plunger 22 sliding in one end. The platform 28 is pivoted on a pin 30 to the press and is swingable about the horizontal axis from the raised full line position to the lowered dotted line position (Fig. 2). A supporting leg or standard 32 is pivoted as at 34 to the underside of the platform at its free end and has a lateral offset 36 outwardly of the pivot to underlie the free end. A vertical or upstanding flange 38 is formed on the offset 36 and engages the free end when the standard is vertically disposed and seated on the ground or other horizontal surface.

An externally threaded cylinder 40 having an open end 42 and a closed outer end 44 is threaded, at its open end, in the internally threaded sleeve 20. A rod 46 has one end slidably disposed through an opening in the end 44 of the cylinder and is provided with a stop 48 which abuts the end 44 exteriorly of the cylinder. The rod is passed through an axial bore in the plunger 22 and suitably fixed thereto. A compression spring 50 is coiled on the rod 46 and abuts against the end 44 of the cylinder and the inner end of the plunger 22 to urge the plunger outwardly of the sleeve.

In use, the platform 28 is fixed in a raised horizontal position by the leg 32 and the plunger 22 is engaged at its outer end by the arm 16. Thus, as the fingers 13 are moved downwardly under the pressure of the cotton, the arm moves the plunger inwardly of the sleeve 20 against the action of the spring as the plunger slides inwardly, the bar 24 slides back over the table 26 and the weight of the bale is easily determined.

The cylinder 40 is adjustable in the sleeve 20 to adjust the tension of the spring and compensate for wear on the spring.

While the best known form of the invention has been disclosed herein, other forms can be made as come within the scope of the appended claims.

Having described this invention, what is claimed is:

1. A bale weight gage for a cotton press having a plurality of vertically extending horizontally spaced slots in one side thereof comprising a horizontal shaft journaled on said side, a plurality of radially extending fingers affixed to said shaft and each extending through one of said slots, a spring urged axially slidable bar, a table underlying the bar and having weight indicia formed thereon to cooperate with the end of the bar, means actuated by the fingers to urge the bar axially in opposition to the spring urgement, a plunger carrying the bar, a sleeve slidably receiving the plunger, a cylinder adjustably mounted in the sleeve and a spring mounted in the cylinder and bearing against the plunger.

2. A bale weight gage for a cotton press having a plurality of vertically extending horizontally spaced slots in one side thereof comprising a horizontal shaft journaled on said side, a plurality of radially extending fingers affixed to said shaft and each extending through one of said slots, a spring urged axially slidable bar, a table underlying the bar and having weight indicia formed thereon to cooperate with the end of the bar, means actuated by the fingers to urge the bar axially in opposition to the spring urgement, a plunger carrying the bar, a sleeve slidably receiving the plunger, a cylinder adjustably mounted in the sleeve, and a spring mounted in the cylinder and bearing against the plunger, said cylinder having an open end and a closed end and being threaded in the sleeve.

3. A bale weight gage for a cotton press having a plurality of vertically extending horizontally spaced slots in one side thereof comprising a horizontal shaft journaled on said side, a plurality of radially extending fingers affixed to said rod and each extending through one of said slots, a spring urged axially slidable bar, a table underlying the bar and having weight indicia formed thereon to cooperate with the end of the bar and means actuated by the fingers to urge the bar axially in opposition to the spring urgement, a plunger carrying the bar, a sleeve slidably receiving the plunger, a cylinder adjustably mounted in the sleeve, a spring mounted in the cylinder and bearing against the plunger, said cylinder having an open end and a closed end and being threaded in the sleeve, and a vertically swingable platform pivotally attached to the press and affixed to said sleeve and means for retaining the platform in a horizontal raised position.

References Cited in the file of this patent

UNITED STATES PATENTS

| | | |
|---|---|---|
| 636,160 | Mitchell | Oct. 31, 1899 |
| 1,553,434 | Cameron | Sept. 15, 1925 |
| 2,175,075 | Blewett | Oct. 3, 1939 |
| 2,570,321 | Christoffer | Oct. 9, 1951 |
| 2,579,444 | Taylor | Dec. 18, 1951 |
| 2,600,827 | Almquist | June 17, 1952 |
| 2,604,035 | Shipley et al. | July 22, 1952 |